US005408737A

United States Patent [19]

Mailey et al.

[11] Patent Number: 5,408,737

[45] Date of Patent: Apr. 25, 1995

[54] APPARATUS FOR STABILIZING A WORK PIECE OF RING CONFIGURATION

[75] Inventors: Desmond Mailey; Jose J. Rodriguez; Jerry P. Fregoe; Curtis L. Stevens; Frank M. Dettmers, Sr., all of San Diego; Glenn L. Brown, Escondido; Gary L. Kitzer, Lemon Grove; James G. Miller, Coronado, all of Calif.; Martin J. Hilbrands, Grand Rapids; Gary L. Vander Stel, Caledonia, both of Mich.

[73] Assignee: Solar Turbines Incorporated, San Diego, Calif.

[21] Appl. No.: 130,931

[22] Filed: Oct. 4, 1993

[51] Int. Cl.[6] .............................................. B23Q 7/00

[52] U.S. Cl. ....................................... 29/559; 269/24; 269/91; 269/289 MR; 269/50

[58] Field of Search ...................... 29/559; 269/47, 50, 269/24, 91, 287, 289 MR

[56] References Cited

U.S. PATENT DOCUMENTS

| | | | |
|---|---|---|---|
| 3,572,216 | 3/1971 | Seesody | 269/91 X |
| 4,429,862 | 2/1984 | Niedecker | 269/47 |
| 4,644,834 | 2/1987 | Hanni et al. | 269/289 MR |

*Primary Examiner*—Tom Hughes

*Attorney, Agent, or Firm*—Kenneth A. Rhoads

[57] ABSTRACT

This invention relates to an apparatus for stabilizing a work piece of ring configuration on a base. The apparatus has a first ring fixed to the base and frictionally positioned within the work piece. A second ring has a portion within the other end of the work piece and a portion covering the other end of the work piece. A plurality of hold downs are connected to a base via hydraulic cylinders and are positioned about the work piece and have arms with rollers attached thereto. In response to actuation of the cylinders, the rollers are automatically swung into position over the second ring and the rollers forcibly urge the second ring and work piece in a direction toward the base.

9 Claims, 2 Drawing Sheets

APPARATUS FOR STABILIZING A WORK PIECE OF RING CONFIGURATION

TECHNICAL FIELD

The present invention relates to apparatus for stabilizing a work piece of ring configuration. More particularly, this invention relates to stabilizing a work piece of ring configuration on an indexible base of a metal working machine.

BACKGROUND ART

Various mechanisms have heretofore been utilized to stabilize ring shaped work pieces during metal working on the work piece. The process of using these past mechanisms was generally work intensive and many of the systems did not function well with indexible bases.

The present invention is directed to overcome one or more of the problems experienced with heretofore utilized stabilizing mechanisms.

DISCLOSURE OF THE INVENTION

In one aspect of the invention, an apparatus is provided for stabilizing a work piece of ring configuration. The apparatus has a first ring which has an outside diameter less than the inside diameter of the work piece. The first ring is connectable to a base and adapted to receive a first end of the work piece.

A second ring is of general "L" cross-sectional configuration defining first and second legs. The first leg of the second ring is of a size sufficient for covering a second end of the work piece. The second leg of the second ring is of dimensions sufficient for insertion into the second end of the work piece.

A plurality of hold downs are each connectable to a base at preselected spaced locations about the first ring and are spaced outwardly therefrom. Each hold down has a body having first and second end portions, a roller, and an arm connected at one end to the second end of the body and at the other end to the roller.

The body first end portion is rotatably connectable relative to a base and is automatically rotatable between a first location at which the roller is laterally spaced from the second ring and a second location at which the roller is adjacent the first leg of said second ring. The body is also moveable along the axis of the body between a first location at which the roller is spaced from the first leg of the second ring and a second location at which the roller is in contact with the first leg of the second ring and urging the second ring into forcible contact with the end of the work piece and in a direction toward the base. Said body is automatically rotatable in response to movement of the body along the axis.

In another aspect of the invention, a process is provided for stabilizing a work piece of ring configuration, having preselected inside and outside dimensions, on an indexible base of a metal working machine having a fixed base adjacent said indexible base. A first ring is selected which has dimensions sufficient for insertion into the work piece and frictionally maintain the work piece. The first ring is connected to the indexible base. A second ring is selected which has a general "L" cross-sectional configuration defining first and second legs with the first leg being of a length sufficient for covering the end of the work piece and the second leg is of dimensions sufficient for coaxial insertion into the work piece. Thereafter a plurality of rollers are coaxially connected to the fixed base and automatically rotated from positions laterally spaced from the work piece to coaxial positions relative to the work piece and adjacent the second ring. The plurality of rollers are then moved into contact with the second ring and forcibly urging the second ring and work piece toward the indexible base.

BEST MODE FOR CARRYING OUT THE INVENTION

Figure 2:
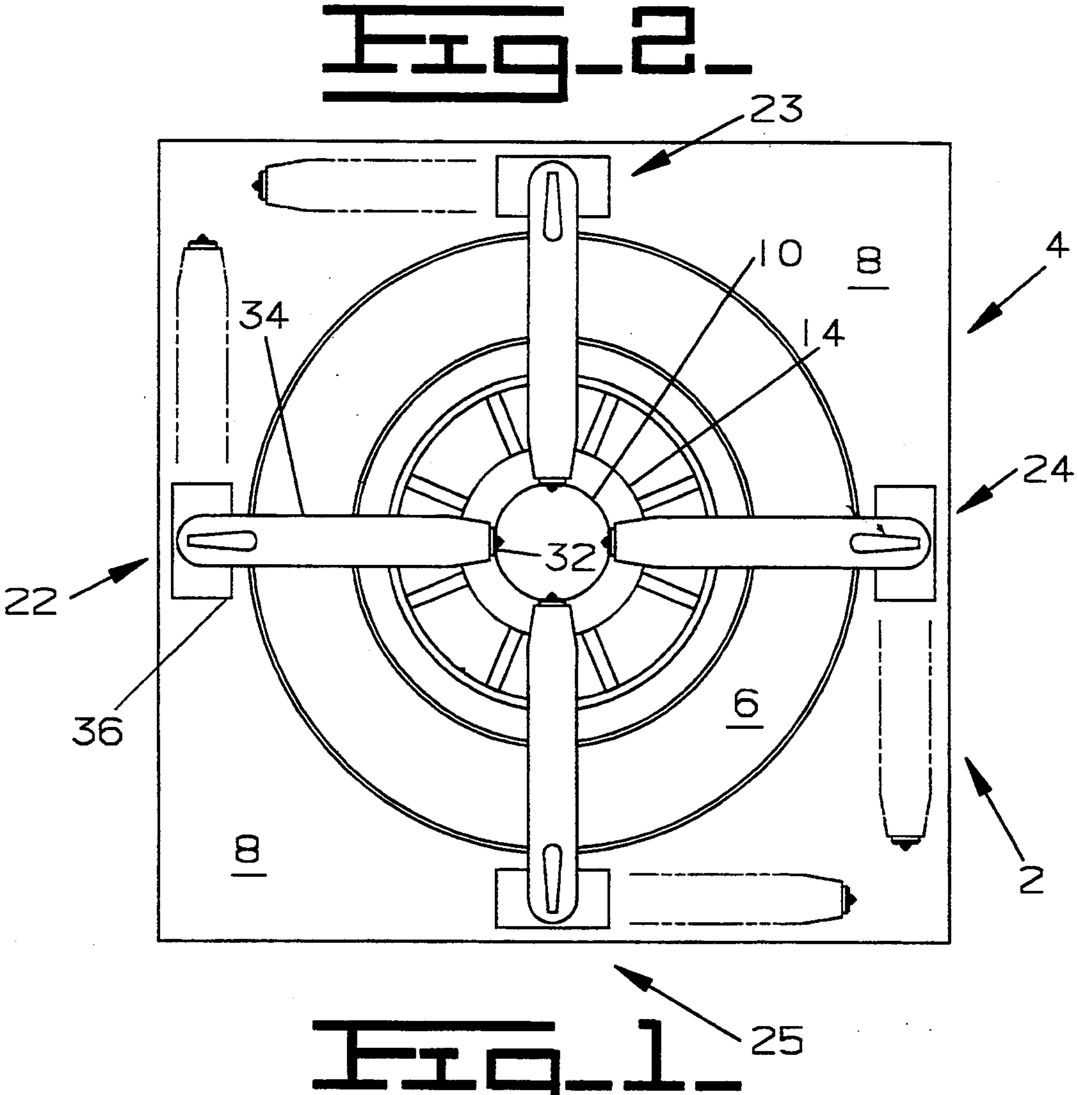
FIG. 2 is a diagrammatic, top elevational view of the apparatus.
Figure 1:
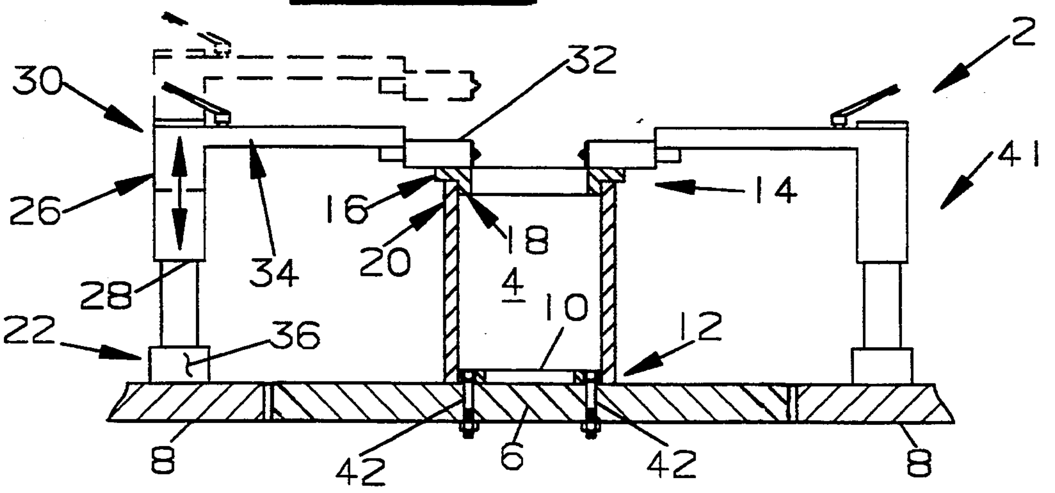
FIG. 1 is a diagrammatic, frontal view in partial section of the apparatus of this invention.

Referring to FIGS. 1 and 2, the apparatus 2 of this invention is provided for stabilizing a work piece 4 of ring configuration. In the preferred embodiment shown the apparatus 2 stabilizes the work piece 4 to an indexible base 6 of a metal working machine which has a fixed base 8 extending about the indexible base 6.

A first ring 10 has an outside diameter less than the inside diameter of the work piece 4 and is connectable to a base, preferably an indexible base, and adapted to receive a first end 12 of the work piece 4.

A second ring 14 of general "L" cross-sectional configuration defines first and second legs 16,18 of the second ring 14. The first leg 16 is of a size sufficient for covering a second end 20 of the work piece 4 and the second leg 18 is of dimensions sufficient for insertion into the second end 20 of the work piece.

It is preferred that the ring and ring portions which are inserted into the work piece 4 be of dimensions sufficient to provide a firm friction fit. Other hereafter described portions of the apparatus 2 of this invention are constructed to securely stabilize the work piece 4 where there is no friction fit of the rings, but greater stability and alignment is provided if rings are frictionally maintained.

A plurality of hold downs 22–25, as better seen in FIG. 2, are connectable to a base, preferably the fixed base 8, at preselected spaced locations about the first ring 10 at locations spaced outwardly therefrom. Preferably the hold downs 22–25 are spaced an equal circumferential distance one from the other and are at least: three in number to provide greater stability of the work piece 4.

For purposes of simplicity the hold downs 12–25 will be hereafter described in more detail with respect to a single hold down 22 since the hold downs 22–25 are identically constructed.

The hold down has a body 26 which has first and second end portions 28,30, and a roller 32 and an arm 34 connected at one end to the second end of the body 26 and at the other end to the roller 32.

The first end portion 28 of the body 26 is rotatably connectable relative to base, preferably the fixed base 8, and is rotatable relative to the base 8 between a first location, shown by dashed lines in FIG. 2, and a second location, shown in solid lines in FIG. 2. At the first rotatable location the roller 32 is laterally spaced from the second ring 14 and at the second rotatable location the roller 32 is adjacent the first leg 16 of the second ring 14.

Figure 3:
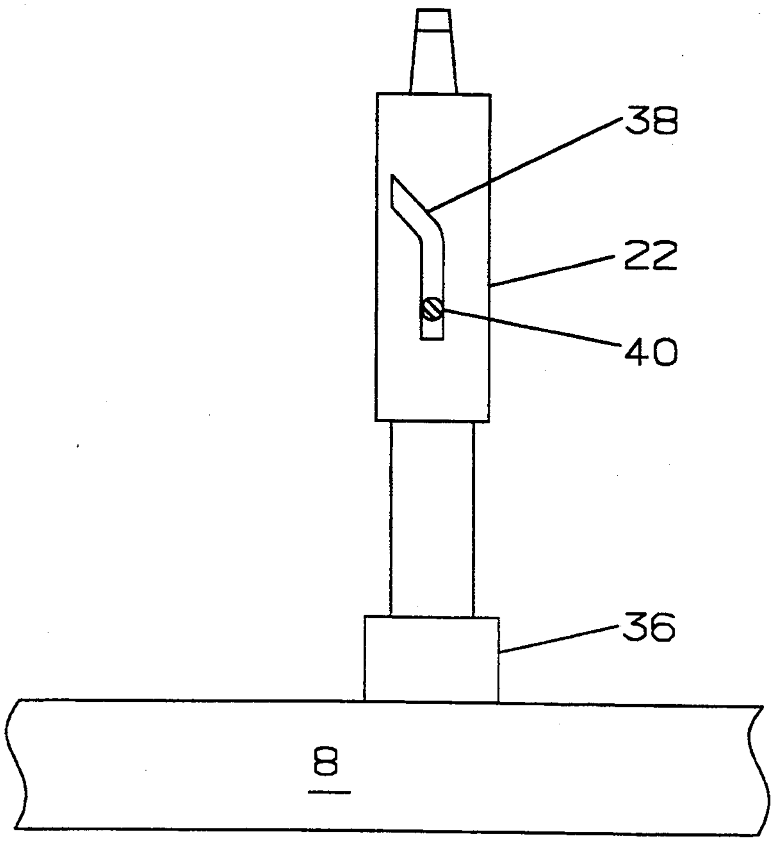
FIG. 3 is a diagrammatic, frontal view of an associated hold down for the apparatus.

Referring to FIGS. 1 and 3, the body 26 is also moveable along the axis of the body 26 between a third location, shown in dashed lines in FIG. 1, at which the roller 32 is spaced from the first leg 16 of the second ring 14 and a fourth location, shown in sold lines in FIG. 1, at which the roller is in contact with the first leg 16 of the second ring 14 and urging the second ring 14 into forcible contact with the end of the work piece 4 and in a direction toward the base 8.

In order to accommodate work pieces 4 of various diameters, the arm 34 of each hold down 22 is controllably extendable to a plurality of different lengths. This adjustable process can be by various apparatus known in the art, for example by one portion of the arm screw threadably connected to the other portion.

Each of the hold downs 22–25 is associated with a hydraulic cylinder 36 for movement of the hold down bodies along their respective axis. Preferably each hold down body has a respective cylinder connected to the fixed base 8. However, the movement can be achieved by one or more cylinders connected to base 8 which then is fixed against rotation, but moveable along the axis of the bodies 22–26.

Referring to FIG. 3, each hold down body 22 includes a cam 38 and a cam follower 40 associated therewith. The cam follower preferably is fixed relative to said hold down body. The cam 38 and cam follower 40 are adapted to automatically rotate the hold down body 22 between the first and the second locations in response to respective movement of the body 26 by the cylinder 36 along the axis between the third and fourth locations.

Preferably, the cam 38 is a slot of "J" configuration and the cam follower 40 is a pin positionable within the slot and connected to the base 8 or other structure to prevent movement of the cam follower 40 relative to the cam 38.

The apparatus of this invention is particularly useful when connected to a punch press machine 44 with the first ring 10 having a plurality of bolts 42 connected thereto and extending along the axis of the ring 10, through the indexible base 6, and there secured with a nut or other fastener.

It should be understood however that reversal of parts, for example the connections and locations of the cam 38 and cam follower 40 can be changed from the above description without departing from this invention.

INDUSTRIAL APPLICABILITY

In the preferred method of this invention, a work piece 4 of ring configuration having preselected inside and outside dimensions is stabilized on an indexible base 6 of a metal working machine which has a fixed base 8 adjacent the indexible base.

In the process, a ring 10 of dimensions is selected which can be inserted into the work piece 4 and frictionally maintain the work piece 4 relative to the indexible base 6. The ring 10 is then secured to the indexible base 6 and the work piece 4 positioned thereabout. A second ring 14 of general "L" configuration defining first and second legs 16,18 is then selected. The first leg 16 is of a width sufficient for covering the end of the work piece 4 and the second leg 18 will be of dimensions sufficient for coaxial insertion into the work piece 4.

A plurality of rollers 32 connected to the fixed base 8 are thereafter automatically rotated from positions laterally spaced from the work piece 4 to coaxial positions relative to the work piece 4 and adjacent the second ring. The rollers 32 are automatically rotated in response to movement of the rollers 32 along the axis of the work piece 4. The rollers 32 are then moved into contact with the second ring 14 and forcibly urging the second ring 14 and work piece 4 toward the indexible base 6.

Other aspects, objects and advantages of this invention can be obtained from a study of the drawings, the disclosure and the appended claims.

We claim:

1. Apparatus for stabilizing a work piece of ring configuration, comprising:

a first ring having an outside diameter less than the inside diameter of the work piece and being connected to a base and adapted to receive a first end of the work piece;

a second ring of general "L" cross-sectional configuration defining first and second legs, said first leg of the second ring being of a size sufficient for covering a second end of the work piece and the second leg being of dimensions sufficient for insertion into the second end of said work piece; and a plurality of hold downs each being connected to a base at preselected spaced locations about the first ring and spaced outwardly therefrom, each hold down having a body having first and second end portions, a roller, and an arm connected at one end to the second end of the body and at the other end to the roller, said body first end portion being rotatably connectable relative to a base and automatically rotatable between a first location at which the roller is laterally spaced from the second ring and a second location at which the roller is adjacent the first leg of said second ring and being moveable along the axis of the body between a third location at which the roller is spaced from the first leg of the second ring and a forth location at which the roller is in contact with the first leg of the second ring and urging the second ring into forcible contact with the end of the work piece and in a direction toward the base, said body being automatically rotatable in response to movement of the body along the axis.

2. An apparatus, as set forth in claim 1 wherein the first ring is connectable to a rotatable indexing base;

the hold down bodies are each connectable to a stationary base; and the length of the arm is controllably extendable to a plurality of lengths.

3. An apparatus, as set forth in claim 1, wherein there are at least three hold downs spaced a substantially equal circumferential distance one from the other.

4. An apparatus, as set forth in claim wherein each of the hold down bodies is associated with a hydraulic cylinder for movement of the hold down bodies along their respective axis.

5. An apparatus, as set forth in claim 1, wherein each hold down body includes a cam associated with a cam follower fixed relative to said hold down body, said cam and cam follower being adapted to automatically rotate the hold down body between the first and the second locations in response to respective movement of the body along the axis between the third and forth locations.

6. An apparatus, as set forth in claim 5, wherein the cam is a slot of "J" configuration and the cam follower is a pin positionable within the slot.

7. An apparatus, as set forth in claim 1, wherein the first ring has a plurality of bolts connected thereto and extending along the axis of the ring.

8. An apparatus, as set forth in claim 1, wherein the stabilizing apparatus is connected to a base of a punch press machine.

9. A process for stabilizing a work piece of ring configuration, having first and second ends and preselected inside and outside dimensions, on an indexable base of a metal working machine having a fixed base adjacent said indexable base, comprising:

selecting a first ring of dimensions sufficient for insertion into the first end of the work piece and frictionally maintaining in position said work piece;

connecting the first ring to the indexable base;

placing the work piece about the first ring;

selecting a second ring, of general "L" cross-sectional configuration defining first and second legs, with said first leg being of a width sufficient for covering the end of the work piece and said second leg being of dimensions sufficient for coaxial insertion into the work piece;

inserting the second leg of the second ring into the (other) second end of the work piece;

moving a plurality of rollers along an axis of the work piece and, in response to such movement, automatically rotating the plurality of rollers from locations laterally spaced from the work piece to locations adjacent the second ring; and continuing to move the plurality of rollers into contact with the second ring and forcibly urging the second ring and work piece toward the indexable base and the work piece into forcible contact with said indexable base.

* * * * *